(12) United States Patent
Hansen

(10) Patent No.: US 7,316,187 B2
(45) Date of Patent: Jan. 8, 2008

(54) RADIAL DISCHARGE ACTUATOR DEVICE

(75) Inventor: David D. Hansen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 416 days.

(21) Appl. No.: 10/944,523

(22) Filed: Sep. 17, 2004

(65) Prior Publication Data

US 2006/0061077 A1 Mar. 23, 2006

(51) Int. Cl.
*B60R 21/26* (2006.01)
(52) U.S. Cl. .......................... 102/530; 280/741
(58) Field of Classification Search ................ 102/530, 102/531; 280/741, 742, 736
See application file for complete search history.

(56) References Cited

U.S. PATENT DOCUMENTS

| | | | |
|---|---|---|---|
| 5,531,473 A | 7/1996 | Rink et al. | |
| 6,098,548 A | 8/2000 | Rink et al. | |
| 6,338,500 B1* | 1/2002 | Perotto | 280/741 |
| 2005/0115453 A1* | 6/2005 | Takahara et al. | 102/530 |

* cited by examiner

*Primary Examiner*—James S Bergin
(74) *Attorney, Agent, or Firm*—Sally J Brown; Pauley Petersen & Erickson

(57) ABSTRACT

An actuator device for actuating a supply of gas generant material in an airbag inflator device. The actuator includes an initiator cup having a cup side wall, an end wall at a first end of the cup side wall, and a cup open end at a second end of the cup side wall opposite the end wall. A header body is connected to the initiator cup at the second end of the cup side wall. The header body and the initiator cup define a storage chamber. A radial discharge charge holder is disposed within the storage chamber and adjacent the header body. The charge holder includes a charge holder side wall substantially parallel to at least a portion of the cup side wall, a charge holder open end disposed toward the initiator cup end wall, and at least one discharge opening disposed in the charge holder side wall. The actuator device includes an inner canister with at least a portion of the inner canister disposed over the charge holder open end to define a charge holder chamber. A first reactive charge is disposed within the charge holder chamber, and a second reactive charge including a fluid or a gel is disposed within the storage chamber between the inner canister and the initiator cup end wall.

20 Claims, 2 Drawing Sheets

RADIAL DISCHARGE ACTUATOR DEVICE

BACKGROUND OF THE INVENTION

This invention relates generally to a pyrotechnic-based actuator device and, more particularly, to an actuator device for actuating a supply of gas generant material in an inflator device of an inflatable vehicle restraint system.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Inflators typically include a supply of a gas generant material for producing inflation gas for inflating the airbag cushion. Inflators also typically include an actuator device that actuates, or initiates inflation gas production from, the gas generant material upon receiving an electric signal, such as, for example, from an electrical system for sensing a vehicle crash.

Commonly available actuator devices generally include a chamber for containing a pyrotechnic material. Such actuator device chambers are commonly formed by a cup portion connected to a base portion. An electrical connector, often extending through the base portion, is in initiating combination with the pyrotechnic material. Upon receiving an electric signal through the electrical connector, the pyrotechnic material reacts. Reaction products from the reacting pyrotechnic material rupture the cup portion. A holder element often is disposed around the pyrotechnic material to further hold a consolidated or packed portion of the pyrotechnic material in combination with the electrical connector and to direct the reaction products to rupture the cup portion in an area of an end wall of the cup portion which is opposite the base portion. The end wall of the cup portion is typically perforated or otherwise weakened to facilitate rupturing thereof.

Commonly used pyrotechnic materials are in a dry, powdered form. However, the pyrotechnic materials are often packed into the charge holder in a slurry form and therein allowed to dry. Wetting the powdered pyrotechnic materials to form a slurry decreases the likelihood of unintentional, premature or accidental reaction of the pyrotechnic material, such as, for example, during actuator device manufacture, assembly or installation. Despite being known to be less likely to react prematurely or accidentally, liquid or gel forms of reactive materials, such as are known in the mining industry, are generally not incorporated into commonly used actuator devices. Such liquid-based reactive materials are not generally used in actuator devices for inflatable restraint systems because a portion of the liquid-based reactive material may be expelled from the ruptured end of the actuator device before reacting, thereby resulting in reaction of less than the full amount of reactive material.

There is a need for an actuator device that incorporates additional types or forms, e.g., a liquid, of reactive materials, e.g., pyrotechnic materials.

SUMMARY OF THE INVENTION

A general object of the invention is to provide an improved actuator device for use in inflatable restraint systems.

A more specific objective of the invention is to overcome one or more of the problems described above.

The general object of the invention can be attained, at least in part, through an improvement to an actuator device for actuating a supply of gas generant material. The actuator device includes an initiator cup connected at a cup side wall to a header body to define a storage chamber. A reactive charge is disposed within the storage chamber and at least one electrical connector is in reaction initiating communication with the reactive charge. Upon initiation of the reactive charge, the reactive charge produces at least one reactive product that ruptures the initiator cup. The improved actuator device includes a radial discharge charge holder disposed within the storage chamber, wherein the radial discharge charge holder directs the at least one reactive product out of the storage chamber through the cup side wall.

The invention further comprehends an actuator device including an initiator cup. The initiator cup includes a cup side wall, an end wall at a first end of the side wall, and a cup open end at a second end of the cup side wall opposite the end wall. A header body is connected to the initiator cup at the second end of the cup side wall. The header body and the initiator cup define a storage chamber. A radial discharge charge holder is disposed within the storage chamber and adjacent the header body. The charge holder includes a charge holder side wall substantially parallel to at least a portion of the cup side wall and a charge holder open end disposed toward the initiator cup end wall. The actuator device further includes an inner canister. At least a portion of the inner canister is disposed over the charge holder open end to define a charge holder chamber. A reactive charge is disposed within the charge holder chamber. Upon reaction initiation by an electric signal, the reactive charge reacts to produce at least one reactive product. The at least one reactive product exits the storage chamber through the cup side wall.

The invention still further comprehends an actuator device including an initiator cup. The initiator cup includes a cup side wall, an end wall at a first end of the cup side wall, and a cup open end at a second end of the cup side wall opposite the end wall. A header body is connected to the initiator cup at the second end of the cup side wall. The header body and the initiator cup define a storage chamber. A radial discharge charge holder is disposed within the storage chamber and adjacent the header body. The charge holder includes a charge holder side wall substantially parallel to at least a portion of the cup side wall, a charge holder open end is disposed toward the initiator cup end wall, and at least one discharge opening disposed in the charge holder side wall. The actuator device includes an inner canister. At least a portion of the inner canister is disposed over the charge holder open end to define a charge holder chamber. A first reactive charge is disposed within the charge holder chamber, and a second reactive charge including a fluid or a gel is disposed within the storage chamber between the inner canister and the initiator cup end wall.

In contrast to the actuator device of the present invention, the prior art generally discloses actuator devices incorporating only powder forms of reactive materials. In particular, the prior art generally fails to provide inflatable restraint system actuator devices that facilitate the incorporation and utilization of fluid or gel forms of reactive materials to an extent as great as may be desired.

As used herein, references to "reaction initiating communication" are to be understood to refer to a relationship between an electrical connector and a reactive charge, whereby the electrical connector, is able to initiate reaction of the reactive charge upon receiving an electric signal from an associated electrical terminal.

Further, references herein to "discharge alignment" are to be understood to refer to the positioning of a rupturable portion over an associated discharge opening such that a reactive product traveling through the discharge opening is directed to and through the rupturable portion.

In addition, references herein to "adjacent" are to be understood to not necessarily require two or more elements be in direct contact with each other.

Other objects and advantages will be apparent to those skilled in the art from the following detailed description taken in conjunction with the appended claims and drawings.

DETAILED DESCRIPTION OF THE INVENTION

The present invention provides an actuator device, for use in inflatable restraint systems, that produces a radial discharge of one or more reaction products through a side wall of an initiator cup portion. The radial discharge actuator device of one embodiment of the invention allows for a two-stage ignition sequence through isolation of two reactive charges in two sealed chambers, respectively. As the two chambers are sealed from each other, the actuator device of this invention can facilitate incorporation of different types or forms of reactive materials for the two reactive charges. For example, the actuator device of one embodiment of the invention can include a powdered reactive material as a first reactive charge in one chamber and a reactive material including a fluid or a gel in the other chamber, without the fluid or gel reactive material contacting the dry, powdered reactive charge material when the device is in an at rest or "normal" state. The radial discharge further reduces or eliminates any expulsion of the fluid or gel reactive charge material out through an end portion of the actuator device before reacting.

Figure 1:
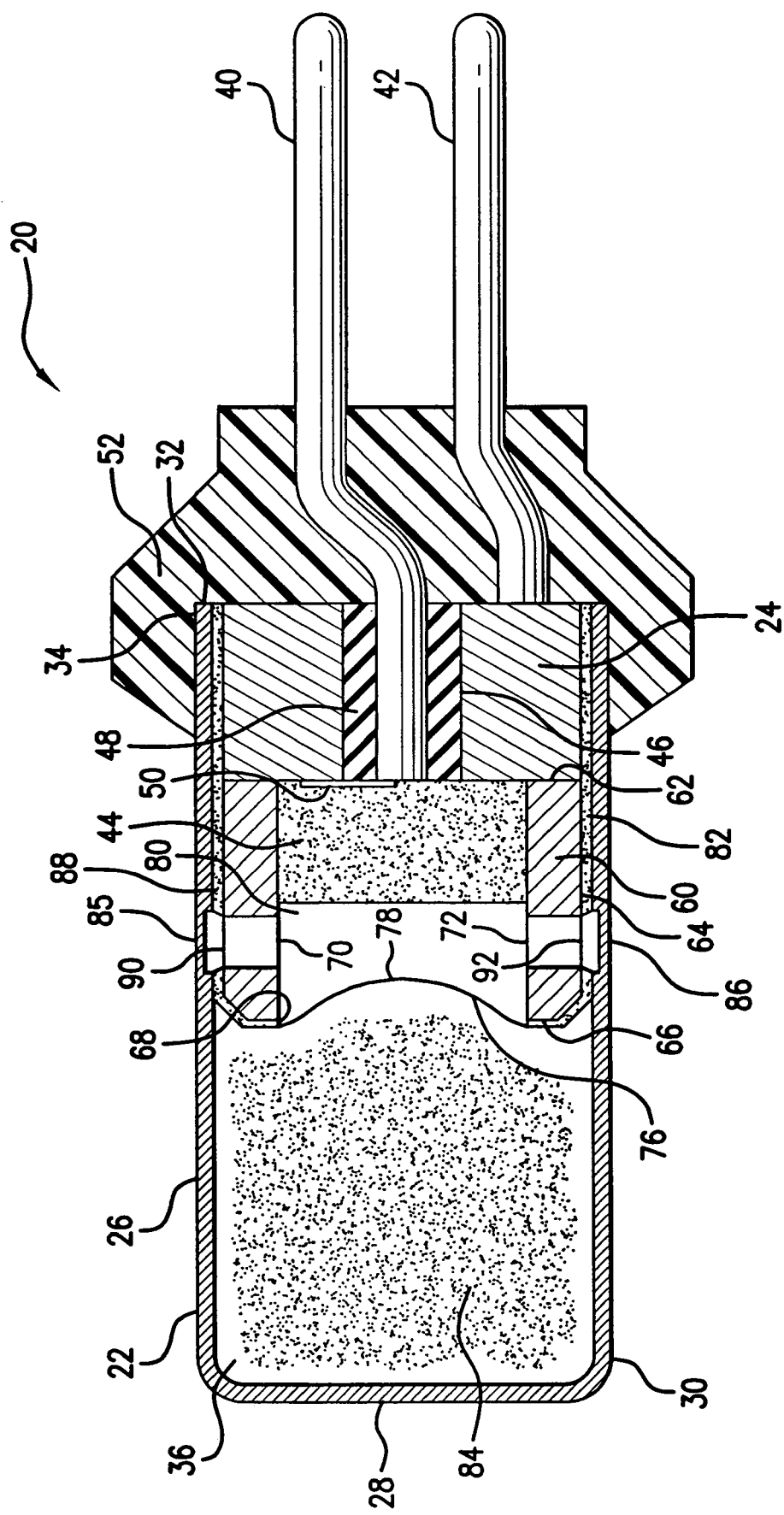
FIG. 1 is a partial sectional view of an actuator device according to one embodiment of this invention.

FIG. 1 is a partial sectional view of an actuator device 20 for use in inflatable restraint systems, according to one embodiment of this invention. The actuator device includes an initiator cup 22 connected to a header body 24. The initiator cup 22 shown in FIG. 1 has a generally cylindrical shape and includes a cup side wall 26, an end wall 28 at a first end 30 of the cup side wall 26, and a cup open end 32 opposite the end wall 28 at a second end 34 of the cup side wall 26. The header body 24 is connected to the initiator cup 22 at the cup side wall second end 34, thereby closing or plugging the cup open end 32 to define a storage chamber 36. The initiator cup 22 is desirably connected to the header body 24 to form a sealed storage chamber 36.

Actuator devices in accordance with the invention generally include at least one electrical connector in reaction initiating communication with a reactive charge material. As defined above, "reaction initiating communication" generally means the electrical connector(s) initiate reaction of the reactive charge upon receiving an electric signal from an associated electrical terminal (not shown). The actuator device 20 includes a pair of electrical connectors, shown as electrical conductive pins 40 and 42, respectively in reaction initiating communication with a first reactive charge 44.

As shown in FIG. 1, the first conductive pin 40 is attached to the header body 24 with one end of the first conductive pin 40 positioned within an eyelet 46. An insulating material 48 within the eyelet 46 can be used to separate and insulate the first conductive pin 40 from the header body 24. The second conductive pin 42, separate from the first conductive pin 40, is attached to the header body 24. As known in the art, a bridgewire 50 can be used to connect the first conductive pin 40 to the header body 24 when the insulating material 48 is present, thereby closing a circuit between the first conductive pin 40 and the second conductive pin 42. As will be appreciated by one skilled in the art following the teachings herein provided, various and alternative configurations and conductive materials known in the art are available for the electrical connector(s) of the invention, such as including but not necessarily limited to, a semiconductor bridge (SCB), a thin film bridge and fiber optic coupled laser firing signal devices.

The actuator device includes an optional molded body 52. The molded body 52 is formed around a portion of the initiator cup 26 at the second end 34, a portion of the header body 24, and a portion of the conductive pins 40 and 42 extending from the header body 24. The molded body 52 is desirably formed of a thermoplastic material and is generally known to one skilled in the art for attaching the actuator device to an inflator device, providing insulation, and/or providing a mating interface for an electrical terminal (not shown) to be associated with the electrical pins 40 and 42. As will be appreciated by one skilled in the art following the teachings herein provided, various and alternative configurations and materials known in the art are available for the molded body of the invention.

The actuator device 20 includes a radial discharge charge holder 60 disposed within the storage chamber 36 and adjacent the header body 24. The charge holder 60 includes a charge holder side wall 64 substantially parallel to a portion of the cup side wall 26 and a base end 62 adjacent the header body 24. The charge holder 60 also includes a charge holder open end 66 opposite the base end 62. The charge holder open end 66 is disposed toward the initiator cup end wall 28 and includes an opening 68. The charge holder 60 includes two discharge openings 70 and 72, respectively. The first discharge opening 70 and the second discharge opening 72 are disposed in opposing sides of the charge holder side wall 64 and adjacent the cup side wall 26.

The actuator device 20 includes an inner canister 76. The inner canister 76 includes a rupturable end portion 78 disposed over the charge holder open end 66 and the opening 68 to define a charge holder chamber 80. In the embodiment shown in FIG. 1, the inner canister includes a canister side wall 82 disposed between the cup side wall 26 and the charge holder side wall 64, as well as the cup side wall 26 and the header body 24. The inner canister 76 is desirably made of metal, such as, for example, stainless steel, and attached to the charge holder 60 by, for example, welding, and more particularly laser welding, to hermetically seal the charge holder chamber 80. The initiator cup 22 can similarly be formed of a metal, such as, for example, stainless steel, and welded to the canister side wall 82. The inner canister 76 provides the actuator device 20 with a second sealed chamber, i.e., the charge holder chamber 80, within the sealed storage chamber 36.

The first reactive charge 44 is disposed in the charge holder chamber 80. As will be appreciated by those skilled in the art, the first reactive charge 44 can include one or more known reactive charge materials, such as a fuel or a pyrotechnic material, which can be actuated by an electric signal introduced through conductive pins 40 and 42. The first reactive charge 44 can include a fuel material and an oxidizer material mixed together and positioned in the charge holder chamber 80. Examples of reactive charges known in the art and useful as the first reactive charge 44 in the actuator device of this invention include mixtures including zirconium and potassium perchlorate (ZPP). In one embodiment of this invention, the first reactive charge 44 is a powder, and at least a portion of the powder first reactive charge 44 is packed around the bridgewire 50 to maintain the first reactive charge 44 in sufficient reaction initiating contact with the bridgewire 50.

A second reactive charge 84 is disposed within the storage chamber 36 between the inner canister 76 and the initiator cup end wall 28, i.e., external of the charge holder chamber 80. In the embodiment of the invention shown in FIG. 1, the second reactive charge 84 is loosely dispersed within the storage chamber 36 and isolated from the first reactive charge 44 by the inner canister 76, and, more particularly, the rupturable end portion 78 of the inner canister 76 disposed over the charge holder open end 66. The second reactive charge 84 can include the same or different reactive material as the first reactive charge 44. As the inner canister 76 seals the charge holder chamber 80 from a remaining portion of the storage chamber 36, the actuator device 20 can include two different types or forms of reactive materials, i.e., one in the charge holder chamber 80 and the other in the remaining portion of the storage chamber 36.

In one particularly preferred embodiment of the invention, the second reactive charge 84 includes a fluid or a gel. Examples of fluid or gel reactive charge materials include known fluid or gel reactive materials, such as, without limitation, sol-gel materials and/or preparations (e.g., sol-gel derived pyrotechnics), water gel materials of high reactivity and combinations thereof. Other suitable fluid or gel reactive charge materials are known, for example, for use in the mining industry. Incorporating a fluid or gel reactive charge generally decreases the likelihood of undesirable accidental or premature reaction, such as, for example, during manufacture or installation of the actuator device. This is because fluid and gel based reactive charge materials are generally less likely to be initiated without the provided initiation source, i.e., the electric signal through the conductive pins 40 and 42.

The first and second reactive charges 44 and 84, upon reaction initiation, both produce one or more reaction products, such as, for example and without limitation, heat and gas. The reaction products are, as is additionally described below, desirably capable of rupturing a portion of the initiator cup 22 and the inner canister 76. In one embodiment of this invention, the reaction products are also desirably capable of actuating a supply generant material in known airbag inflator devices. Referring to the actuator device 20, an electrical signal is conducted to the first reactive charge 44 through the conductive pins 40 and 42. The electric signal initiates reaction of the first reactive material 44 to produce at least one reaction product.

As identified above, the invention advantageously provides an actuator device having a radial discharge of reaction products. In the embodiment shown in FIG. 1, the radial discharge charge holder 60 directs at least a portion of the reaction products out of the storage chamber 36 through the cup side wall 26. The reaction products exit the charge holder chamber 80, and thus the storage chamber 36, through the two discharge openings 70 and 72 by rupturing the cup side wall 26 disposed over the discharge openings 70 and 72. In one embodiment of the invention, as shown in FIG. 1, the cup side wall 26 includes two rupturable portions 85 and 86 disposed in discharge alignment with the discharge openings 70 and 72, respectively. As defined above, "discharge alignment" refers to the positioning of a rupturable portion over an associated discharge opening, such that reaction products traveling through the discharge opening are directed through and rupture the rupturable portion. In one embodiment of the invention, as shown in FIG. 1, the first rupturable portion 85 and the second rupturable portion 86 are formed by a thinning of the cup side wall 26 over the first and second discharge openings 70 and 72, respectively. As will be appreciated by one skilled in the art following the teachings herein provided, the thinned portions of the cup side wall 26 forming the rupturable portions 85 and 86 promote rupturing of the cup side wall 26, while desirably maintaining a hermetically sealed storage chamber 36 before reaction initiation of the first reactive charge 44. As will also be appreciated by one skilled in the art following the teachings herein provided, various and alternative sizes, shapes and configurations are available for the rupturable portions of the invention, such as, for example, the rupturable portion can include perforations that facilitate rupturing of the rupturable portion. In one embodiment of this invention, the rupturable portions include both a thinned cup side wall and cruciform perforations.

As discussed above, in the embodiment of the invention shown in FIG. 1, the inner canister 76 includes a canister side wall 82 adjacent an outer surface 88 of a charge holder side wall 64 and disposed between the cup side wall 26 and the charge holder side wall 64. In the actuator device 20 of FIG. 1, the canister side wall 82 also includes two rupturable portions 90 and 92 disposed in discharge alignment with the discharge openings 70 and 72, respectively. The rupturable portions 90 and 92 can include the same or a different configuration from the rupturable portions 85 and 86 of the cup side wall 26. As shown in FIG. 1, the inner canister rupturable portions 90 and 92 are formed by a thinned portion of the canister side wall 82.

The reaction products produced upon reaction initiation of the first reactive charge 44 desirably rupture the rupturable portions 90 and 92 of the inner canister 76 and the rupturable-portions 85 and 86 of the cup side wall 26. The reaction products also rupture the rupturable end portion 78 of the inner canister 76. The rupturable end portion 78 can also desirably include a thinned and/or perforated portion to facilitate rupture. Upon rupturing the rupturable end portion 78, one or more of the reaction products contact and initiate reaction of the second reactive charge 84. The reaction of the second reactive charge 84 produces at least one reactive product, such as, for example, a gas and/or heat. The actuator device 20 provides a two-stage discharge with a first initial reactive product discharge from the reaction of the first reactive charge 44 and a second reactive product discharge from the subsequent reaction of the second reactive charge 84.

In one embodiment of the invention, the reaction products produced by the first and second reactive charges 44 and 84 desirably only exit the storage chamber 36 radially through the discharge openings 70 and 72. In such an embodiment, the initiator cup 22 ruptures only in the area of the rupturable portions 85 and 86. As the initiator cup end wall 28 desirably does not rupture, the radial discharge of the reaction products through the discharge openings 70 and 72 desirably reduces or eliminates any expulsion of a portion of the second reactive charge 84 out through the initiator cup end wall 28 by the reaction products from the reaction of the first reactive charge 44. The second reactive material 84 is thus contained within the storage chamber 36 to react, and more desirably, to substantially completely react. In one embodiment of the invention, the cup portion 22 is desirably formed of a material and/or includes a thickness to reduce or eliminate rupturing of the initiator cup 22 anywhere other than the rupturable portions 85 and 86. As will be appreciated by one skilled in the art following the teachings herein provided, variations in the two-stage discharge of the actuator device of the invention are available by varying the size, shape and/or configuration of one or more of the charge holder chamber, the storage chamber, and the amount of reactive material for one or both the first and second reactive charges.

Figure 2:
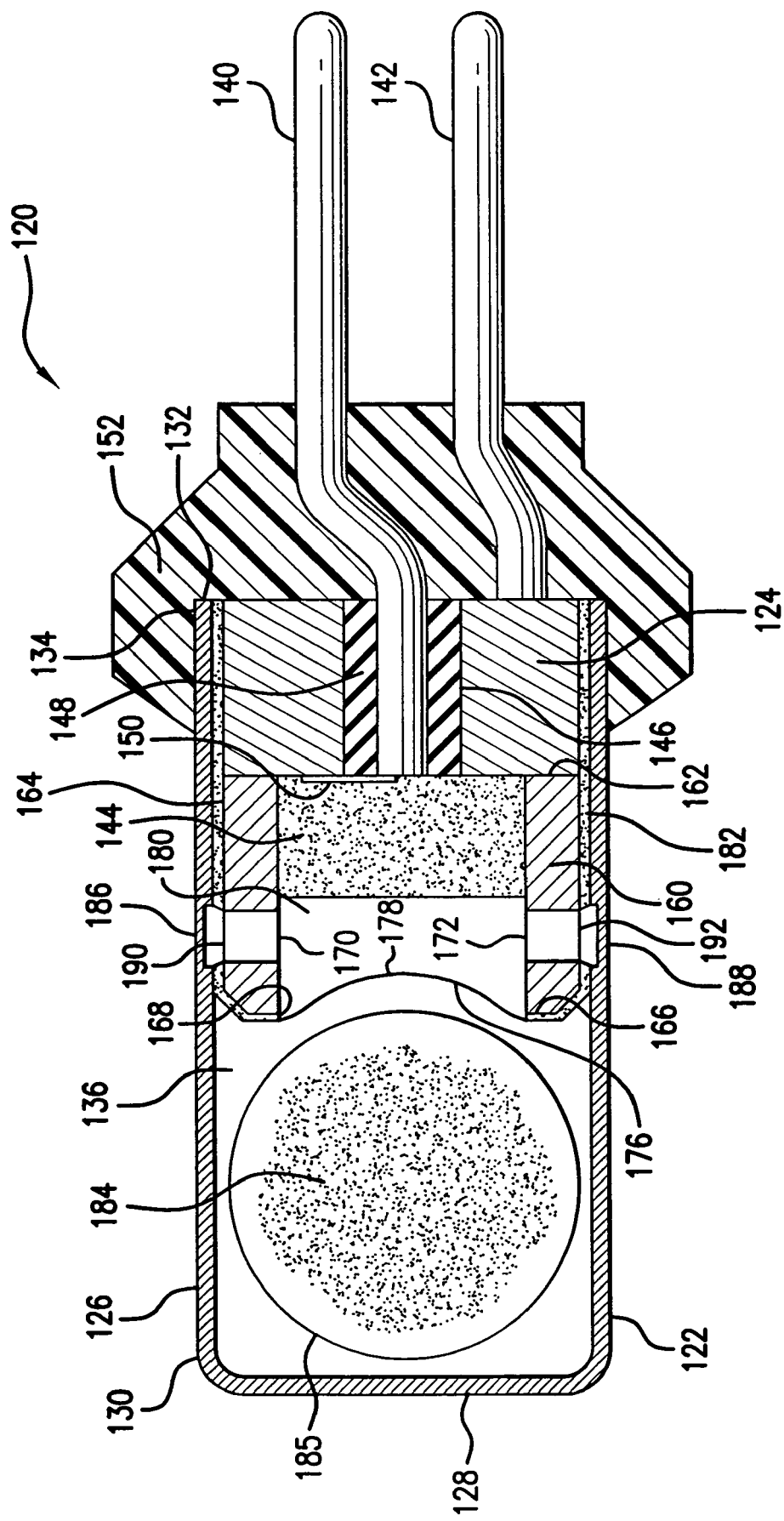
FIG. 2 is a partial sectional view of an actuator device according to another embodiment of this invention.

FIG. 2 is a partial sectional view of an actuator device 120 illustrating another embodiment of the invention. The actuator device includes an initiator cup 122 connected to a header body 124. The initiator cup 122 has a generally cylindrical shape and includes a cup side wall 126, an end wall 128 at a first end 130 of the cup side wall 126, and a cup open end 132 opposite the end wall 128 at a second end 134 of the cup side wall 126. The header body 124 is connected at the cup side wall second end 134 and closes or plugs the cup open end 132 to define a sealed storage chamber 136.

The actuator device 120 includes a pair of electrical conductive pins 140 and 142 in reaction initiating communication with a first reactive charge 144. The first conductive pin 140 is attached to the header body 124 with one end of the first conductive pin 140 positioned within an eyelet 146. An insulating material 148 within the eyelet 146 separates and insulates the first conductive pin 140 from the header body 124. The second conductive pin 142, separate from the first conductive pin 140, is attached to the header body 124. A bridgewire 150 connects the first conductive pin 140 to the header body 124 to close a circuit between the first conductive pin 140 and the second conductive pin 142. A thermoplastic molded body 152 is formed around a portion of the initiator cup 126 at the second end 134, a portion of the header body 124 and a portion of the conductive pins 140 and 142 adjacent the header body 124.

The actuator device 120 includes a radial discharge charge holder 160 disposed within the storage chamber 136 and adjacent the header body 124. The charge holder 160 includes a generally cylindrical charge holder side wall 164 extending substantially parallel to a portion of the cup side wall 126 and a base end 162 adjacent the header body 124. The charge holder 160 also includes a charge holder open end 166 opposite the base end 162. The charge holder open end 166 is disposed toward the initiator cup end wall 128 and includes an opening 168. The charge holder 160 includes a first discharge opening 170 disposed opposite a second discharge opening 172 in the charge holder side wall 164. As will be appreciated by one skilled in the art following the teachings herein provided, the actuator device of one embodiment of the invention includes more than one discharge opening appropriately positioned to neutralize discharge forces resulting from relatively high pressure reaction products exiting the discharge opening.

The actuator device 120 includes an inner canister 176. A rupturable end portion 178 of the inner canister 176 is disposed over the charge holder open end 166 and the opening 168 to define a hermetically sealed charge holder chamber 180. A canister side wall 182 is adjacent an outer surface of a charge holder side wall 164. The canister side wall 182 is disposed between the cup side wall 126 and the charge holder side wall 164 and the header body 124.

The first reactive charge 144 is disposed in the charge holder chamber 180. As will be appreciated by those skilled in the art, the first reactive charge 144 can include one or more known reactive charge materials, such as described above, which can be actuated by an electrical signal introduced through conductive pins 140 and 142. In one embodiment of this invention, the first reactive charge 144 is a powder material, and at least a portion of the powder first reactive charge 144 is packed around the bridgewire 150 to maintain the first reactive charge 144 in reaction initiating contact with the bridgewire 150.

A second reactive charge 184 is disposed within the storage chamber 136 between the inner canister 176 and the initiator cup end wall 128. In the embodiment of the invention shown in FIG. 2, the second reactive charge 184 is disposed within a generally spherical bladder 185. The second reactive charge 184 can include the same or different reactive material as the first reactive charge 144. In one particularly preferred embodiment of the invention, the second reactive charge 184 includes a fluid or a gel. The bladder 185 is desirably formed of a thin material, such as a thin film, that can be ruptured, as described below, by a reaction product, such as heat or gas, produced by the reaction of the first reactive charge 144. Examples of materials for use in forming the bladder 185 include, without limitation, thermoplastic materials, rubber, latex, and combinations thereof. As will be appreciated by one skilled in the art following the teachings herein, the use of a bladder to contain a fluid or gel reactive charge can desirably facilitate manufacture of the actuator device and/or further reduce the chance of accidental reaction, such as during manufacture of the actuator device. As will also be appreciated by one skilled in the art following the teachings herein, various and alternative sizes, shapes, configurations and materials are available for forming or manufacturing the bladder of the invention. The encapsulation of the second reactive charge 184 in the bladder 185 can be performed by any means available in the art.

As discussed above with reference to FIG. 1, the actuator device 120 receives an electric signal through the electrical conductive pins 140 and 142. The electric signal initiates reaction of the first reactive charge 144 to produce one or more reaction products. The radial discharge charge holder 160 directs at least a portion of the reaction products out of the storage chamber 136 through the two discharge openings 170 and 172 by rupturing the cup side wall 26. The cup side wall 126 includes two rupturable portions 186 and 188 disposed in discharge alignment with the discharge openings 170 and 172, respectively. In the embodiment of the invention shown in FIG. 2, the first rupturable portion 186 and the second rupturable portion 188 are formed by a thinning of the cup side wall 126 over the first and second discharge openings 170 and 172, respectively. As discussed above, various and alternative sizes, shapes and configurations are available for the rupturable portions of the invention, such as, for example, a rupturable portion can be formed by or include perforations that facilitate rupturing of the rupturable portion.

The canister side wall 182 also includes two rupturable portions 190 and 192 disposed in discharge alignment with the discharge openings 170 and 172, respectively. The rupturable portions 190 and 192 can include the same or a different configuration from the rupturable 186 and 188 of the cup side wall 126, such as, for example, the corresponding thinned portion of the canister side wall 182.

The reaction product(s) produced upon reaction initiation of the first reactive charge 144 also ruptures the rupturable end portion 178 of the inner canister 176. Upon exiting the charge holder chamber 180 into the storage chamber 136, one or more reactive product(s) further ruptures, or otherwise opens, the bladder 185. In one embodiment of the invention, the bladder 185 is ruptured by heat which melts or otherwise disintegrates a portion of the bladder 185. In another embodiment of the invention, the bladder 185 is ruptured by pressure within the storage chamber 136. Once the bladder 185 is ruptured, one or more of the reaction products contact and initiate reaction of the second reactive charge 184. The reaction of the second reactive charge 184 produces at least one reactive product, such as, for example, a gas and/or heat. In one embodiment of the invention, the reaction products produced by the reacting first and second reactive charges 144 and 184 only exit the storage chamber 136 through the discharge openings 170 and 172 and the ruptured canister side wall 169 and ruptured cup side wall 126, as described above with reference to FIG. 1.

Thus, the invention provides an actuator device that, upon initiation, produces a radial discharge of reaction products. The radial discharge actuator device of one embodiment of this invention incorporates a two-stage ignition and discharge sequence by isolating two reactive charges in two sealed chambers. By enclosing the sealed charge holder chamber within the larger storage chamber the actuator device is able to include two forms of reactive material, e.g., both dry and fluid or gel-based reactive charge materials, without the reactive materials contacting. Furthermore, the radial discharge of reaction products reduces or eliminates any expulsion of a fluid or gel reactive charge material through a ruptured end of the initiator cup, thereby desirably providing a more complete reaction of the fluid or the gel reactive charge within the actuator device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an actuator device for actuating a supply of gas generant material in an inflatable restraint system, the actuator device including an initiator cup connected at a cup side wall to a header body to define a storage chamber, a reactive charge disposed within the storage chamber, and at least one electrical connector in reaction initiating communication with the reactive charge, wherein upon initiation of the reactive charge, the reactive charge produces at least one reactive product that ruptures the initiator cup, the improvement comprising:

a radial discharge charge holder disposed within the storage chamber, the radial discharge charge holder including at least one discharge opening disposed adjacent to the cup side wall, wherein upon initiation of the reactive charge, the at least one reactive product exits the storage chamber through the at least one discharge opening and ruptures the cup side wall.

2. The actuator device according to claim 1 wherein the cup side wall comprises at least one rupturable portion and each of the at least one rupturable portion is disposed in discharge alignment with one of the at least one discharge opening.

3. The actuator device according to claim 2 wherein the radial discharge charge holder comprises a base end and an open end opposite the base end, the base end is disposed adjacent to the header body and the open end is disposed toward an initiator cup end wall, the actuator device additionally comprising:

an inner canister disposed over the charge holder open end to define a charge holder chamber;

a first reactive charge disposed within the charge holder chamber; and a second reactive charge disposed within the storage chamber between the inner canister and the initiator cup end wall.

4. The actuator device according to claim 3 wherein the second reactive charge comprises a fluid or a gel.

5. The actuator device according to claim 4 wherein the second reactive charge is disposed within a bladder.

6. The actuator device according to claim 3 wherein the inner canister comprises a canister side wall adjacent an outer surface of a charge holder side wall, the canister side wall including at least one rupturable portion, wherein each of the at least one rupturable portion is disposed in discharge alignment with one of the at least one discharge opening.

7. The actuator device according to claim 6 wherein the charge holder chamber is hermetically sealed.

8. The actuator device according to claim 1 additionally comprising two discharge openings disposed on opposing sides of the charge holder.

9. An actuator device for an inflatable restraint system, the actuator device comprising:

an initiator cup including a cup side wall, an end wall at a first end of the side wall, and a cup open end at a second end of the cup side wall opposite the end wall;

a header body connected to the initiator cup at the second end of the cup side wall, the header body and the initiator cup defining a storage chamber;

a radial discharge charge holder disposed within the storage chamber and adjacent the header body, the charge holder including a charge holder side wall substantially parallel to at least a portion of the cup side wall, at least one discharge opening extending through the chargeholder side wall and disposed adjacent to the cup side wall, and a charge holder open end disposed toward the initiator cup end wall;

an inner canister, at least a portion of the inner canister disposed over the charge holder open end to define a charge holder chamber; and a reactive charge disposed within the charge holder chamber;

wherein, upon reaction initiation by an electric signal, the reactive charge reacts to produce at least one reactive product and the at least one reactive product exits the storage chamber through the at least one discharge opening and the cup side wall.

10. The actuator device according to claim 9 wherein the cup side wall comprises at least one rupturable portion and each of the at least one rupturable portion is disposed in discharge alignment with one of the at least one discharge opening.

11. The actuator device according to claim 10 additionally comprising a second reactive charge disposed within the storage chamber between the inner canister and the initiator cup end wall.

12. The actuator device according to claim 11 wherein the second reactive charge comprises a fluid or a gel.

13. The actuator device according to claim 12 wherein the second reactive charge is disposed within a bladder.

14. The actuator device according to claim 9 wherein the inner canister comprises a canister side wall adjacent an outer surface of the charge holder side wall, the canister side wall including at least one rupturable portion, wherein each of the at least one rupturable portion is disposed in discharge alignment with one of the at least one discharge opening.

15. The actuator device according to claim 9 wherein the charge holder chamber is hermetically sealed.

16. An actuator device for an inflatable restraint system, the actuator device comprising:
    an initiator cup including a cup side wall, an end wall at a first end of the cup side wall, and a cup open end at a second end of the cup side wall opposite the end wall;
    a header body connected to the initiator cup at the second end of the cup side wall, the header body and the initiator cup defining a storage chamber;
    a radial discharge charge holder disposed within the storage chamber and adjacent the header body, the charge holder including a charge holder side wall substantially parallel to and disposed adjacent to at least a portion of the cup side wall, a charge holder open end disposed toward the initiator cup end wall, and at least one discharge opening disposed in the charge holder side wall;
    an inner canister, at least a portion of the inner canister disposed over the charge holder open end to define a charge holder chamber;
    a first reactive charge disposed within the charge holder chamber; and
    a second reactive charge comprising a fluid or a gel and disposed within the storage chamber between the inner canister and the initiator cup end wall.

17. The actuator device according to claim 16 wherein the second reactive charge is disposed within a bladder.

18. The actuator device according to claim 16 wherein the inner canister comprises a canister side wall adjacent an outer surface of the charge holder side wall, the canister side wall including at least one rupturable portion, wherein each of the at least one rupturable portion is disposed in discharge alignment with one of the at least one discharge opening.

19. The actuator device according to claim 18 wherein the cup side wall comprises at least one rupturable portion and each of the at least one rupturable portion is disposed in discharge alignment with one of the at least one discharge opening.

20. The actuator device according to claim 16 wherein the charge holder chamber is hermetically sealed.

* * * * *